(12) United States Patent
Sato et al.

(10) Patent No.: US 9,193,269 B2
(45) Date of Patent: Nov. 24, 2015

(54) VEHICLE CHARGER MOUNTING STRUCTURE

(75) Inventors: Kenji Sato, Shizuoka (JP); Seiko Suzuki, Shizuoka (JP)

(73) Assignee: SUZUKI MOTOR CORPORATION, Tokyo (JP)

( * ) Notice: Subject to any disclaimer, the term of this patent is extended or adjusted under 35 U.S.C. 154(b) by 427 days.

(21) Appl. No.: 13/701,248

(22) PCT Filed: Apr. 27, 2011

(86) PCT No.: PCT/JP2011/060324
§ 371 (c)(1),
(2), (4) Date: Feb. 6, 2013

(87) PCT Pub. No.: WO2011/152164
PCT Pub. Date: Dec. 8, 2011

(65) Prior Publication Data
US 2013/0134939 A1    May 30, 2013

(30) Foreign Application Priority Data
May 31, 2010    (JP) .................................. 2010-124238

(51) Int. Cl.
*H02J 7/00*    (2006.01)
*B60L 11/18*    (2006.01)
(Continued)

(52) U.S. Cl.
CPC ............ *B60L 11/1809* (2013.01); *B60L 3/003* (2013.01); *B60L 11/1803* (2013.01); *B60L 11/1816* (2013.01); *B60L 11/1853* (2013.01); *B60L 11/1855* (2013.01); *B60L 11/1864* (2013.01); *B60L 11/1877* (2013.01); *B60K 1/00* (2013.01);
(Continued)

(58) Field of Classification Search
CPC ............ B60L 11/1809; B60L 11/1803; B60L 11/1855; B60L 11/1864; B60L 3/003; B60L 11/1877; B60L 11/1853; B60L 11/1816; B60L 2210/30; B60L 2240/36; Y02T 90/127; Y02T 10/7061; Y02T 10/7241; B60K 1/00
USPC ........................................................ 320/109
See application file for complete search history.

(56) References Cited

U.S. PATENT DOCUMENTS
3,898,547 A * 8/1975 Poole ........................... 320/109

FOREIGN PATENT DOCUMENTS
DE    10229048    1/2004
JP    05-105143    4/1993
(Continued)

OTHER PUBLICATIONS
Machine translation of JP2005-168158A obtained from https://www.j-platpat.inpit.go.jp/web/all/top/BTmTopEnglishPage.*
(Continued)

*Primary Examiner* — Jack Chiang
*Assistant Examiner* — Brandon Bowers
(74) *Attorney, Agent, or Firm* — Troutman Sanders LLP

(57) ABSTRACT

A vehicle charger mounting structure has a system circuit, a charger and a relay. The system circuit constitutes a high-voltage circuit and includes an onboard battery. The charger charges the onboard battery with electric power supplied from an exterior. The relay is provided between the onboard battery and the charger. The relay operates and controls to be in an open state except during charging. The relay is provided to be housed in a casing different from the charger. The charger is provided to be housed in a housing space provided in a vehicle body structure part.

5 Claims, 2 Drawing Sheets

(51) Int. Cl.
　　 *B60L 3/00* 　　　(2006.01)
　　 *B60K 1/00* 　　　(2006.01)

(52) U.S. Cl.
　　 CPC .......... *B60L 2210/30* (2013.01); *B60L 2240/36* (2013.01); *Y02T 10/7005* (2013.01); *Y02T 10/7061* (2013.01); *Y02T 10/7241* (2013.01); *Y02T 90/127* (2013.01); *Y02T 90/14* (2013.01)

(56) References Cited

FOREIGN PATENT DOCUMENTS

| | | |
|---|---|---|
| JP | 07-231514 | 8/1995 |
| JP | 10-112902 | 4/1998 |
| JP | H10-112902 | 4/1998 |
| JP | 2005-168158 | 6/2005 |
| JP | 2007-276605 | 10/2007 |
| JP | 2009-202677 | 9/2009 |
| JP | 2010-013058 | 1/2010 |

OTHER PUBLICATIONS

Machine translation of JP2010-013058A obtained from https://www.j-platpat.inpit.go.jp/web/all/top/BTmTopEnglishPage.*
Machine translation of JP2009-202677A obtained from https://www.j-platpat.inpit.go.jp/web/all/top/BTmTopEnglishPage.*
Machine translation of JP2007-276605A obtained from https://www.j-platpat.inpit.go.jp/web/all/top/BTmTopEnglishPage.*
International Preliminary Report on Patentability, dated Jan. 8, 2013, which issued during the prosecution of International Patent Application No. PCT/JP2011/060324, which corresponds to the present application.
International Search Report for PCT/JP2011/060324.

\* cited by examiner

VEHICLE CHARGER MOUNTING STRUCTURE

CROSS-REFERENCE TO RELATED APPLICATIONS

This is a U.S. national phase application under 35 U.S.C. §371 of International Patent Application No. PCT/JP2011/060324, filed on Apr. 27, 2011, and claims benefit of priority to Japanese Patent Application No. 2010-124238, filed on May 31, 2010. The International Application was published on Dec. 8, 2011 as International Publication No. WO 2011/152164 under PCT Article 21(2). The entire contents of these applications are hereby incorporated herein by reference.

TECHNICAL FIELD

The present invention relates to a vehicle charger mounting structure for mounting a charger on a vehicle, and particularly to a connection configuration to a system circuit of the charger and an on-vehicle structure of the charger in the vehicle such as a hybrid vehicle and an electric vehicle.

BACKGROUND ART

In recent years, attention is attracted to automobiles in which environment is considered, such as a hybrid vehicle (also called "HEV"), an electric vehicle (also called "EV"), and a fuel cell vehicle. Lately, there is a hybrid vehicle (also called "PHEV") on which a charger is mounted. Meanwhile, laws and regulations are being prepared at home and abroad.

When a charger is mounted on a vehicle together with a battery, a circuit configuration is such that an output terminal of the charger is directly connected to a terminal of the battery for reasons such as simplification of a circuit and reduction of an electric power loss. Thus, in a state where the electric power of the battery is in use, such as during traveling of the vehicle, a high voltage is applied to an output section being a DC side of the charger. Since a high voltage is applied to a charger during traveling of a vehicle as described above, a place on which the charger is mounted is required to be a part where predetermined protection can be attained in case of occurrence of an accident. On the other hand, the charger has an insulation structure thereinside, and the electric power does not flow near an external connection terminal of a charging port being an input side, even in a state where the electric power of the battery is in use.

In Patent Literature 1 described later, it is disclosed to provide a relay for cutting off an on-vehicle charger from a high-voltage circuit.

CITATION LIST

Patent Literature

Patent Literature 1: Japanese Laid-open Patent Publication No. 10-112902

SUMMARY OF INVENTION

Technical Problem

When a hybrid vehicle is made a PHEV, a charger is to be newly mounted. Further, when the hybrid vehicle is made the PHEV, there is an inconvenience that a component mounting space is further limited in order to increase a battery capacity.

Besides, in view of a structure of a vehicle, among spaces which appear to be spacially vacant are the space to be reduced by deformation of a vehicle body due to an external force and the space which is not reduced. Since the space to be reduced is necessary by a certain degree or more for the sake of energy absorption in both a large vehicle and a small vehicle, there is an inconvenience that a component mounting space becomes limited in the small vehicle. When securing of interior comfort and loading ability of occupants are considered, further contrivance is necessary in order to secure a mounting space of components constituting a high-voltage circuit.

It is highly necessary that a high-voltage circuit which includes a battery is protected, and it is required to improve mounting ability while securing protection performance by dispersedly disposing respective functional units constituting the circuit or disposing the respective functional units with priority being considered.

In aforementioned Patent Literature 1, since its object is to mount components constituting the high-voltage circuit on the vehicle exterior, attaining both securing of protection performance and improvement of mounting ability as above with regard to mounting of a charger is not an object, and thus no concrete structure suitable for achieving such an object is disclosed.

An object of the present invention is to heighten mounting ability while securing protection performance, to consider priority to keep travel performance, and to achieve protection performance in which electrical safety is considered, by giving priority to components constituting a high-voltage circuit and dispersedly disposing the components.

Solution to Problem

A vehicle charger mounting structure according to the present invention is characterized in that the vehicle charger mounting structure has: a system circuit constituting a high-voltage circuit, including an onboard battery; a charger charging the onboard battery with electric power supplied from the exterior; and a relay provided between the onboard battery and the charger, the relay operating and controlling to be in an open state except during charging, wherein the relay is provided to be housed in a casing different from the charger, and wherein the charger is provided to be housed in a housing space provided in a vehicle body structure part.

Further, the vehicle charger mounting structure according to the present invention is also characterized in that the charger is disposed to be alienated from each wall surface of the housing space.

Further, the vehicle charger mounting structure according to the present invention is also characterized in that the housing space provided in the vehicle body structure part is a vertically flat housing space provided to be continued downward from a vehicle body rear panel in a side where a charging port connected to the charger is disposed.

Further, the vehicle charger mounting structure according to the present invention is also characterized in that the vehicle charger mounting structure is a charger mounting structure of a three-wheel or four-wheel vehicle and that the housing space provided in the vehicle body structure part is a spare tire house.

Further, the vehicle charger mounting structure according to the present invention is also characterized in that the housing space provided in the vehicle body structure part has a structure to absorb energy at a time of collision.

Advantageous Effects of Invention

According to the present invention, a relay disposed between an onboard battery and a charger and operates and controls to be an open state except during charging is provided to be housed in a casing different from the charger, while the charger is provided to be housed in a housing space provided in a vehicle body structure part, so that it becomes possible to heighten mounting ability while securing protection performance, to consider priority to maintain traveling performance, and to achieve protection performance in which electrical safety is considered.

DESCRIPTION OF EMBODIMENTS

Hereinafter, preferred embodiments of the present invention are described with reference to the attached drawings.

(First Embodiment)

Figure 1:
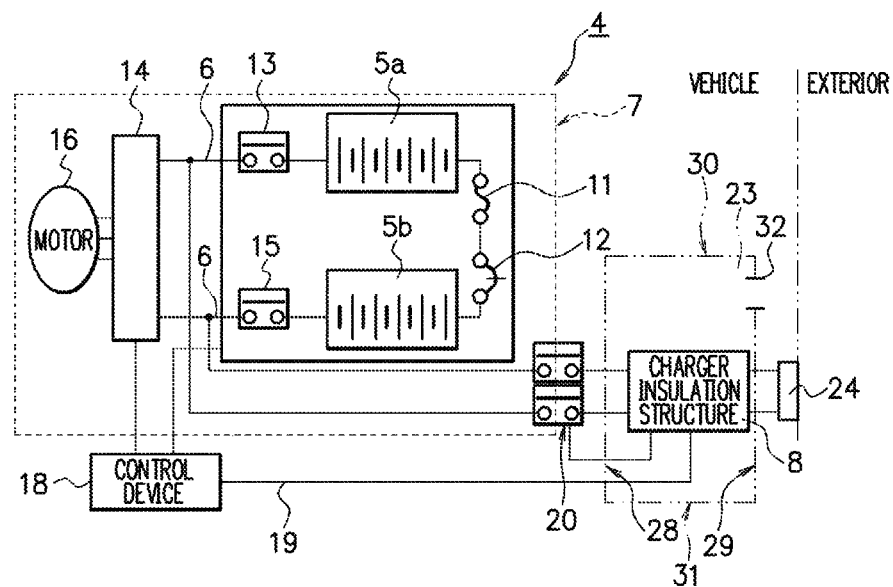
FIG. 1 is a diagram showing a configuration of a vehicle charger mounting structure according to a first embodiment.
Figure 2:
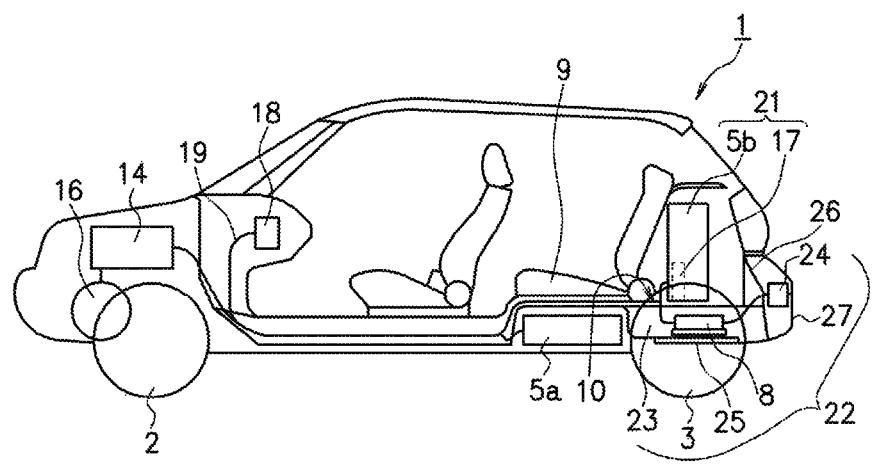
FIG. 2 is a diagram showing a mounting state of a system circuit and a charger on a four-wheel vehicle.

FIG. 1 is a diagram showing a configuration of a vehicle charger mounting structure according to a first embodiment. Further, FIG. 2 is a diagram showing a mounting state of a system circuit and a charger on a four-wheel vehicle. In FIG. 2, a reference numeral 1 indicates a vehicle, a reference numeral 2 indicates a front wheel, and a reference numeral 3 indicates a rear wheel.

A vehicle charger mounting structure 4 according to a first embodiment has, as shown in FIG. 1, a system circuit 7 which includes two onboard batteries 5a, 5b and constitutes a high-voltage circuit by connecting to the onboard batteries 5a, 5b via a bus (also called a "power feeding busbar") 6, and a charger 8 which is connected to the bus 6 and charges the onboard batteries 5a, 5b with electric power supplied from exterior.

More concretely, the system circuit 7 constituting the high-voltage circuit includes the first onboard battery 5a, the second onboard battery 5b, a fuse 11, a safety switch 12, relays 13, 15, an inverter 14, a motor 16 for propelling the vehicle, and relays 20, and these respective sections are connected to each other via the bus 6.

As shown in FIG. 2, the first onboard battery 5a is disposed below a rear sheet 9 and in front of the rear wheel 3. Further, the second onboard battery 5b is disposed behind of the rear seat 9 and on a rear floor 10.

The first and second onboard batteries 5a, 5b are connected in series via the fuse 11 and the safety switch 12. The first onboard battery 5a is connected to the inverter 14 via the first relay 13. Besides, the first onboard battery 5b is connected to the inverter 14 via the second relay 15. The inverter 14 performs AC/DC conversion to feed electric power to the motor 16 or performs AC/DC conversion of power generation from the motor 16, and is disposed above the front wheel 2 of a vehicle 1. To the inverter 14 is connected the motor 16 positioned in a front side of the front wheel 2 of the vehicle 1.

Further, the relays 20 which operate/control to keep an open state except during charging are each disposed between the first onboard battery 5a and the charger 8, and between the second onboard battery 5b and the charger 8. The charger 8 for externally supplied electric power is not used during traveling of the vehicle, and even if the relays 20 are in the open state except during charging, influence on maintaining vehicle traveling performance is comparatively small. The relays 20 are housed in a junction box 17. Further, the junction box 17 in which the relays 20 are housed and the second onboard battery 5b are housed in a casing 21, which is mounted behind the rear seat 9 and on the rear floor 10.

In a side rearer than the inverter 14 of the vehicle 1, there is disposed a control device 18. The control device 18 is connected to each section of the system circuit 7 constituting the high-voltage circuit and of the charger 8, via a communication line 19, as shown in FIG. 1 and FIG. 2. The control device 18 detects various states and controls the respective sections, and it is also the control device 18 that performs charge control including operation of the relay 20.

On the other hand, the charger 8 is provided in a manner to be housed in a housing space 23 provided in a vehicle body structure part 22 in the rear of the vehicle 1. The charger 8 is a charger for externally supplied electric power, and has a charging port 24 which has, thereinside, an external connection terminal to supply/connect the externally supplied electric power in an input side of the charger 8, and the relay 20 is connected to an output side of the charger 8. Note that the charger 8 has an insulative structure thereinside, having a circuit structure without electric leakage even in a case of occurrence of a short circuit or the like of the charging port 24.

More detailedly, as shown in FIG. 2, the charger 8 is housed in a spare tire house being the comparatively large housing space 23 provided in the vehicle body structure part 22 near the rear wheel 3 in the rear of the vehicle 1, and is fixed to a bottom surface of the housing space 23. The vehicle body structure part 22 is made up of the housing space 23 being the rear floor 10 and the spare tire house, a member 25, a vehicle body rear panel 26, and the like, and the charger 8 is provided by being housed in the housing space 23, while the charging port 24 is disposed between the vehicle body rear panel 26 and a rear bumper 27 in the part rearer than the casing 21 of the vehicle 1.

The housing space 23 provided in the vehicle body structure part 22 is a vertically flat housing space provided to be continued downward from the vehicle body rear panel 26 in a side where the charging port 24 connected to the charger 8 is disposed, and the charger 8 is provided to be mounted in a center part alienated from front-rear and right-left direction wall surfaces 28, 29 of the housing space 23. In other words, as shown in FIG. 1, the charger 8 is disposed in a manner to be alienated from the front wall surface 28, the rear wall surface 29, a right wall surface 30, and a left wall surface 31 of the housing space 23. Since the charger 8 generates large heat during charging, a structure is adopted in which cooling performance is considered in disposition of the charger 8. Further, it is preferable that a housing structure has a sufficient space for ventilation, and the housing space 23 preferably has a duct structure 32 (see FIG. 1).

The charger 8, during charging when the vehicle 1 becomes in a vehicle stop state and electric power is supplied from the exterior, is connected to the system circuit 7 constituting the high-voltage circuit via the relay 20, that is, is included in the high-voltage circuit. However, when the vehicle 1 is in the vehicle stop state, it can be said that collision hardly occurs from a side of an external power feeding device (not shown).

Further, though not illustrated detailedly, the junction box 17 in which the relay 20 is housed and the second onboard battery 5b are held by a highly-stiff protection frame (not shown) in a manner to be surrounded from top and bottom and right and left, and covered by a cover (not shown), constituting the casing 21. The protection frame is stiffly fixed to a predetermined range of a floor panel of the vehicle body and structure parts provided in inner panels of side bodies of both right and left sides. Further, the protection frame has a reinforcing structure such as a partition wall.

As the vehicle body structure part 22 of the rear of the vehicle 1, various members 25 such as a right and left pair of side frames (not shown) and a cross member (not shown) are provided in a surrounding area of a convex-and-concave structure to be a spare tire house and so on which is provided in the rear floor 10, and a structure is had which extends in a width direction, a forward and backward direction, and a vertical direction, to absorb energy while securing stiffness. The vehicle panel is reinforced.

Further, when a large external force of a predetermined value or more is applied to the vehicle 1 due to collision from the rear or the like and the vehicle body structure part 22 is largely deformed, there is a possibility that a capacity of the housing space 23 is reduced, which damages an article housed thereinside. In this embodiment, the charger 8 being an electrical component is housed as the article, but the charger 8 is cut off from the system circuit 7 constituting the high-voltage circuit by the relay 20 during traveling of the vehicle, that is, except during charging, so that secondary damage such as electrical leakage can be prevented.

As described above, the mounting state in which a charging state where the charger 8 becomes the high-voltage circuit is considered is shown, and as a result of having both a connection configuration to the system circuit 7 of the charger 8 and an on-vehicle structure of the charger 8, it becomes possible to heighten mounting ability while securing protection performance, to consider priority to maintain traveling performance, and to achieve protection performance in which electrical safety is considered.

(Second Embodiment)

Figure 3:
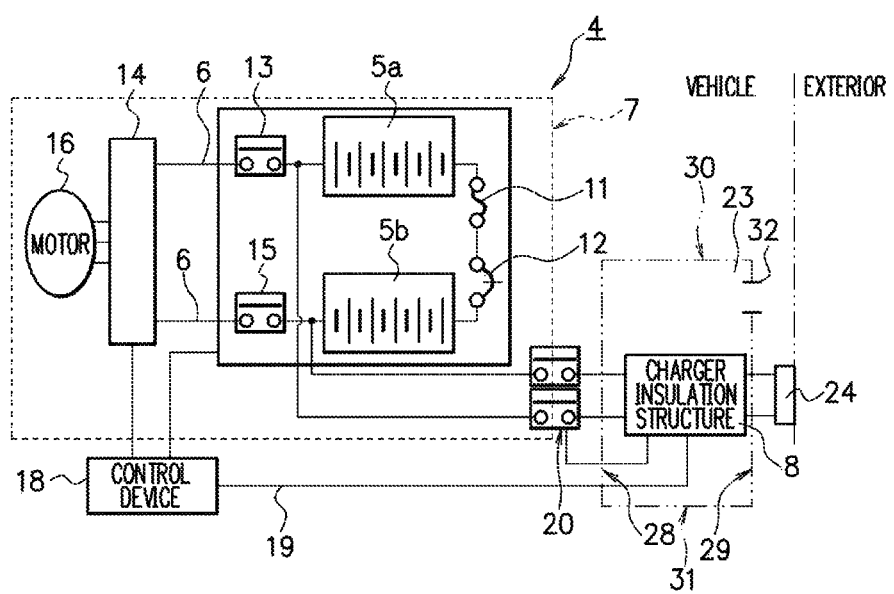
FIG. 3 is a diagram showing a configuration of a vehicle charger mounting structure according to a second embodiment.

FIG. 3 is a diagram showing a configuration of a vehicle charger mounting structure according to a second embodiment. Note that in explanation the same reference numeral is given to a configuration element performing the same function as in the first embodiment.

In the first embodiment, as shown in FIG. 1, branching points between the first relay 13 and the inverter 14 and between the second relay 15 and the inverter 14 are connected to the relays 20, respectively. In contrast, in the second embodiment, branching points between a first onboard battery 5a and a first relay 13 and between a second onboard battery 5b and a second relay 15 are connected to relays 20, respectively.

Note that the first and second relays 13, 15 are sometimes had by a high-voltage component except a charger 8 mounted on a vehicle. Further, in terms of hardware, it is also possible to configure that the first and the second relays 13, 15 are annexed to or housed in the onboard batteries 5a, 5b.

In the second embodiment also, similarly to in the first embodiment, as a result of having both a connection configuration to a system circuit 7 of a charger 8 and an on-vehicle structure of the charger 8, it becomes possible to heighten mounting ability while securing protection performance, to consider priority to maintain traveling performance, and to achieve protection performance in which electrical safety is considered.

Hereinabove, although the present invention has been explained by using various embodiments, the present invention is not limited only to those embodiments but alteration or the like is possible within the scope of the present invention. For example, a housing space 23 can be a structure different from a recessed housing space such as a spare tire house provided in a floor panel, and can be a vertically flat housing space or the like provided between an outer panel and an inner panel of a vehicle body panel.

Industrial Applicability

The present invention relates to a vehicle charger mounting structure for mounting a charger on a vehicle such as a three-wheel vehicle and a four-wheel vehicle.

The invention claimed is:

1. A vehicle charger mounting structure comprising:
a system circuit constituting a high-voltage circuit, including an onboard battery;
a charger charging the onboard battery with electric power supplied from the exterior; and
a relay provided between the onboard battery and said charger, the relay operating and controlling to be in an open state except during charging,
wherein said relay is housed in a casing different from said charger and is disposed on a rear floor, and
wherein said charger is provided to be housed in a housing space provided to be continued downward from a vehicle body rear panel.

2. The vehicle charger mounting structure according to claim 1,
wherein said charger is disposed to be alienated from each of the wall surfaces of the housing space.

3. The vehicle charger mounting structure according to claim 1,
wherein the housing space is a housing space provided in a side where a charging port connected to said charger is disposed.

4. The vehicle charger mounting structure according to claim 3,
wherein the vehicle charger mounting structure is a charger mounting structure of a three-wheel or four-wheel vehicle and the housing space provided in the vehicle body structure part is a spare tire house.

5. The vehicle charger mounting structure according to claim 1, wherein the housing space provided in the vehicle body structure part has a structure to absorb energy at a time of collision.

\* \* \* \* \*